US012688416B2

(12) United States Patent
Tolba et al.

(10) Patent No.: US 12,688,416 B2
(45) Date of Patent: Jul. 21, 2026

(54) APPROXIMATE COMPUTING AND DATA REUSE ARCHITECTURES FOR AI EDGE DEVICES

(71) Applicant: Khalifa University of Science and Technology, Abu Dhabi (AE)

(72) Inventors: Mohammed F. Tolba, Abu Dhabi (AE); Hani Saleh, Abu Dhabi (AE); Mahmoud Al-Qutayri, Abu Dhabi (AE); Baker Mohammad, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 715 days.

(21) Appl. No.: 18/042,994

(22) PCT Filed: Oct. 5, 2021

(86) PCT No.: PCT/IB2021/059141
§ 371 (c)(1),
(2) Date: Feb. 24, 2023

(87) PCT Pub. No.: WO2022/074570
PCT Pub. Date: Apr. 14, 2022

(65) Prior Publication Data
US 2023/0368017 A1 Nov. 16, 2023

Related U.S. Application Data

(60) Provisional application No. 63/087,542, filed on Oct. 5, 2020.

(51) Int. Cl.
*G06N 3/08* (2023.01)

(52) U.S. Cl.
CPC .................................... *G06N 3/08* (2013.01)

(58) Field of Classification Search
CPC ....................................................... G06N 3/08
See application file for complete search history.

(56) References Cited

U.S. PATENT DOCUMENTS

| | | | | |
|---|---|---|---|---|
| 11,561,767 | B2 * | 1/2023 | Gope | G06N 3/045 |
| 11,797,830 | B2 * | 10/2023 | Gunnam | G06N 3/063 |
| 2017/0213127 | A1 * | 7/2017 | Duncan | G16B 50/30 |

(Continued)

FOREIGN PATENT DOCUMENTS

| | | |
|---|---|---|
| EP | 3091486 A2 | 11/2016 |
| WO | 2020236976 A1 | 11/2020 |

OTHER PUBLICATIONS

Denton et al., "Exploiting Linear Structure Within Convolutional Networks for Efficient Evaluation", Available Online at: https://arxiv.org/abs/1404.0736, 2014, 11 pages.

(Continued)

*Primary Examiner* — Eliyah S. Harper
(74) *Attorney, Agent, or Firm* — Kilpatrick Townsend & Stockton LLP

(57) ABSTRACT
A method can be used to reduce the memory storage and energy used by deep neural networks. The method can include determining the weights associated with the deep neural network. An input feature map can be received and used with the weights to generate approximated weights. Using the approximated weights and the input feature map a convolution inference can be performed.

11 Claims, 8 Drawing Sheets

(56) References Cited

U.S. PATENT DOCUMENTS

| | | | |
|---|---|---|---|
| 2019/0303750 A1 | 10/2019 | Kumar et al. | |
| 2020/0097818 A1* | 3/2020 | Li | G06N 3/0464 |
| 2020/0201443 A1* | 6/2020 | Huang | G06N 3/0464 |
| 2021/0104331 A1* | 4/2021 | Mysore | G16C 20/70 |
| 2021/0303909 A1* | 9/2021 | Gunnam | G06N 3/0495 |
| 2022/0026228 A1* | 1/2022 | Kasioumis | G06N 3/08 |
| 2023/0368017 A1* | 11/2023 | Tolba | G06N 3/0495 |

OTHER PUBLICATIONS

Han et al., "Deep Compression: Compressing Deep Neural Networks with Pruning, Trained Quantization and Huffman Coding", Available Online at: https://arxiv.org/abs/1510.00149, 2016, pp. 1-14.
Application No. PCT/IB2021/059141 , International Search Report and Written Opinion, Mailed On Nov. 30, 2021, 11 pages.
Wang et al., "Deep Neural Network Approximation for Custom Hardware: Where We've Been, Where We're Going", Available Online at: https://arxiv.org/abs/1901.06955. ACM Comput. Surv. vol. 52, No. 2, May 2019, pp. 1-37.

* cited by examiner

APPROXIMATE COMPUTING AND DATA REUSE ARCHITECTURES FOR AI EDGE DEVICES

CROSS-REFERENCE TO RELATED APPLICATION

This application claims the benefit of and priority to U.S. Provisional Application No. 63/087,542, filed on Oct. 5, 2020, and titled "APPROXIMATE COMPUTING AND DATA REUSE ARCHITECTURES FOR AI EDGE DEVICES," the content of which is herein incorporated by reference in its entirety for all purposes.

BACKGROUND

Neural Networks, for example Deep Neural Networks (DNNs) can be computationally and memory intensive. For example, some DNNs can use tens to hundreds of megabytes of parameters and billions of computations. The computation and memory requirements can make hardware implementation difficult for some devices. For example, implementation can be especially difficult for devices that have limited computing and power resources. These devices can include Internet of Things (IoT) devices, edge devices, and mobile devices.

BRIEF DESCRIPTION OF THE DRAWINGS

Various embodiments in accordance with the present disclosure will be described with reference to the drawings, in which.

DETAILED DESCRIPTION

Figure 1:
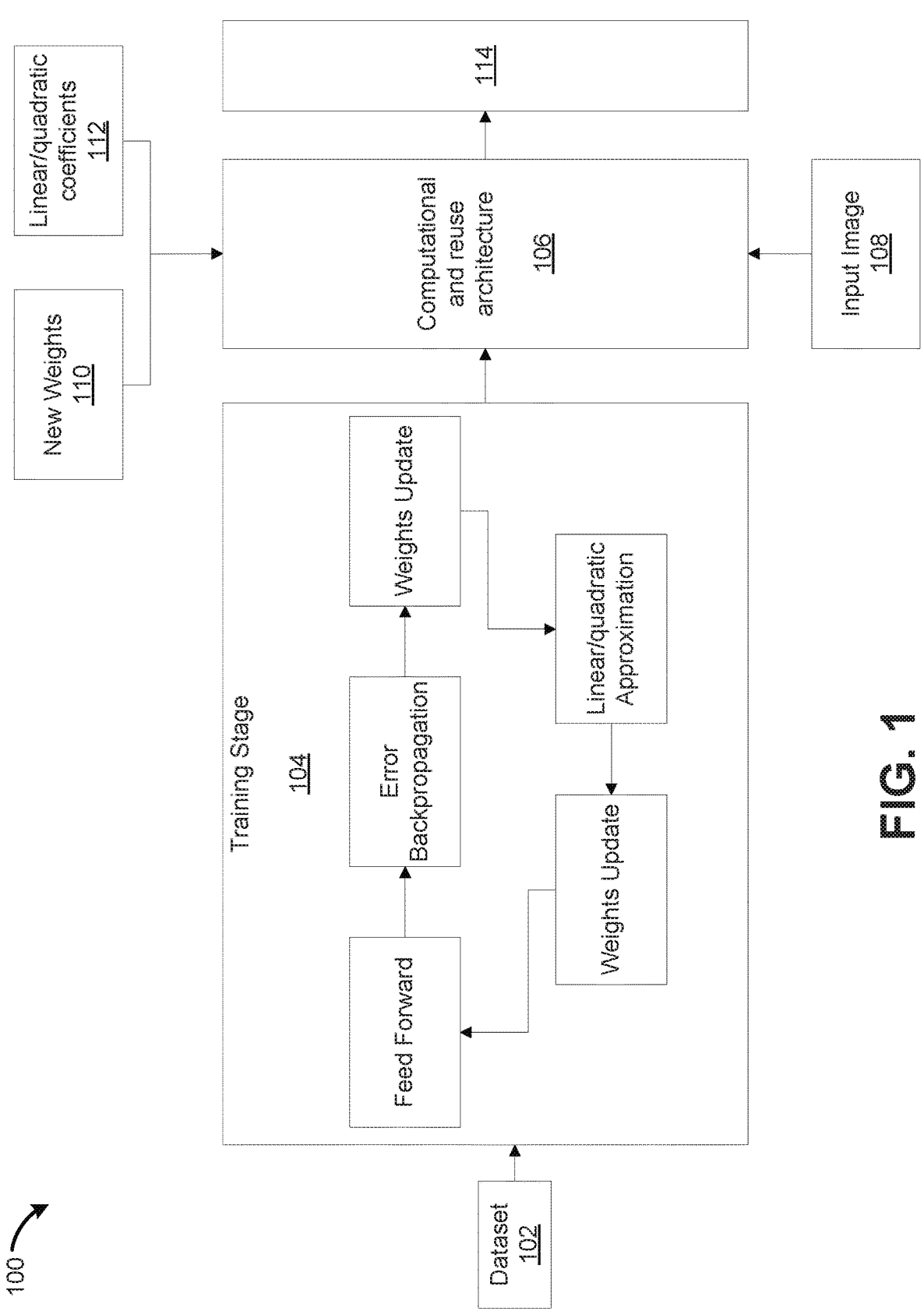
FIG. 1 illustrates a block diagram of an example process for approximation of DNNs weights, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

DEEP neural networks (DNNs) are used with a wide variety of artificial intelligence (AI) applications. For example, DNNs can be used with Internet-of-Things applications, computer vision, speech recognition, robotics, autonomous vehicles, cancer detection and/or video games. In the IoT domain, deep learning techniques can be used, for example, to extract user behavior and ambient context from sensor data because DNNs can be used to learn abstract representations. However, there are some challenges for using DNNs on resource-constrained devices. For example, AI-based edge computing needs dedicated hardware for AI to execute tasks efficiently on resource-constrained devices. Having DNNs running on edge and mobile devices have lots of advantages such as security, bandwidth requirement, and real-time processing. However the memory overhead limits DNNs from being incorporated into edge and mobile devices on a large scale. Advanced DNNs may need tens to hundreds of megabytes of parameters and billions of computations for a particular inference. This can result in long inference time and long training time. DNNs can use lots of multiply and accumulate (MAC) operations in the convolution and FC layers, which account for over 99% of the overall computations. Large storage memory, rapid data movement and a large number of computations can make it very challenging to directly implement DNNs based AI applications on existing edge devices hardware due to their limited computing and power resources.

Training DNN can be an expensive task that may use specialized hardware such as GPUs. Hundreds of millions of parameters in the DNNs can be iteratively updated hundreds of thousands of times during the training phase. Training may use more computations compared to inference, however, inference can be subject to stricter real-world design constraints and it can be beneficial to decrease the cost of inference as much as possible. Approximating the DNNs weights during the training can cause additional computations which may lead to longer training time. However, the approximation of DNNs weights can reduce the number of parameters, computations, and memory accesses in the inference stage.

An important characteristic of DNNs parameters is their error-resilience, which can be exploited by using the fundamentals of approximate computing to design energy-efficient hardware accelerators. Various methods can use approximate computing to improve the energy efficiency and performance of DNN hardware through pruning, quantization, and/or weight sharing. However, using approximate computing in DNNs can result in retraining of the network to recover some or all of the accuracy loss due to using approximate methods. Pruning is an iterative technique to prune weights of small values and retrain the DNN. Similar neurons can be wired together and therefore pruned away. In various embodiments, pruning can result in up to a nine times reduction in the number of weights. DNNs quantization and weight sharing methods can be used to reduce the number of bits needed for each weight. Pruning, trained quantization, and/or coding techniques can be used to decrease the memory storage of neural networks without affecting their accuracy.

The data access can be minimized by reusing the same piece of data as much as possible. However, the storage capacity of low-cost memories can be limited. Some example data flow methods can be or include weight stationary (WS), output stationary (OS), and/or row stationary (RS) dataflows. WS data flow can be used to reduce the energy consumption of accessing the weights, for example, by maximizing the weights access from the register file (RF)

at the PE. The OS data flow can reduce the energy consumption of accessing the partial sums. The RS dataflow can increase the reuse at the RF for data to achieve overall efficiency.

Reducing the number of computations and memory storage for DNNs inference can allow DNNs to be used on edge resource-constrained devices, such as IoT nodes. For example, data reuse can be used with approximate computing techniques to develop a computational reuse method. In this method a specific computation operation is reused multiple times in the PE array processor. The computational reuse method uses repetition of a specific number of computations inside the PE array. Taking a common factor of a specific number of computations (DNNs computations), a reduction of DNNs computations can be achieved.

Techniques described herein discuss an algorithm that can reduce the number of DNNs parameters. For example, the algorithm can approximate the DNNs weights using linear and quadratic approximations methods. In various embodiments, the approximation method in the training can result in a reduction rate of 47.8× on LeNet 300-100 parameters and 40.4×on LeNet 300-100 computations in the inference phase. In the inference phase, a computational reuse technique is proposed to reduce the number MAC operations inside the PE array. The computational reuse technique can result in reduced memory storage requirements and less overall memory accesses.

Turning to FIG. 1 a block level diagram of an example process 100 is shown where linear and quadratic approximation techniques are used to approximate DNNs weights in the back-propagation during the training block 104. Then, all weights are replaced with the linear/quadratic coefficients 112 to implement the inference using the proposed data/computational reuse architecture block 106. Such that different weights could be computed using the same coefficients. This allows for a repetition of the weights across the PE array. Based on this repetition, DNN sub-computations are reused to reduce DNNs memory storage and improve energy efficiency at the cost of increased the training time. In addition or alternatively to the computational reuse, a data reuse method can be used.

The process 100 can include receiving a dataset 102 into a training block 104. During the training block 104, linear and quadratic approximation techniques can be used to approximate the DNN weights. The process 100 can include a computational and reuse architecture block 106. This stage can receive the weights from the training stage 104, new weights 110, linear and/or quadratic coefficients 112, and/or an input image 108. The process 100 can include a classification block 114.

Not all the DNNs weights have to be retained at the exact value achieved by training, many of these weights can be approximated using a number of approximation methods. In various embodiments a method to approximate the DNNs weights during the training can be or include: step 1, in the Backpropagation: after updating all DNNs weights, all the weights are divided into a uniform group of weights. Then, each group is approximated using linear/quadratic approximation methods. For each group of weights, linear/quadratic coefficients are used to compute the new DNNs weights. Step 2, in the feed forward: the new weights are used to perform the feed forward path. The previous steps are performed for each batch and epoch during the training phase.

Figure 2:
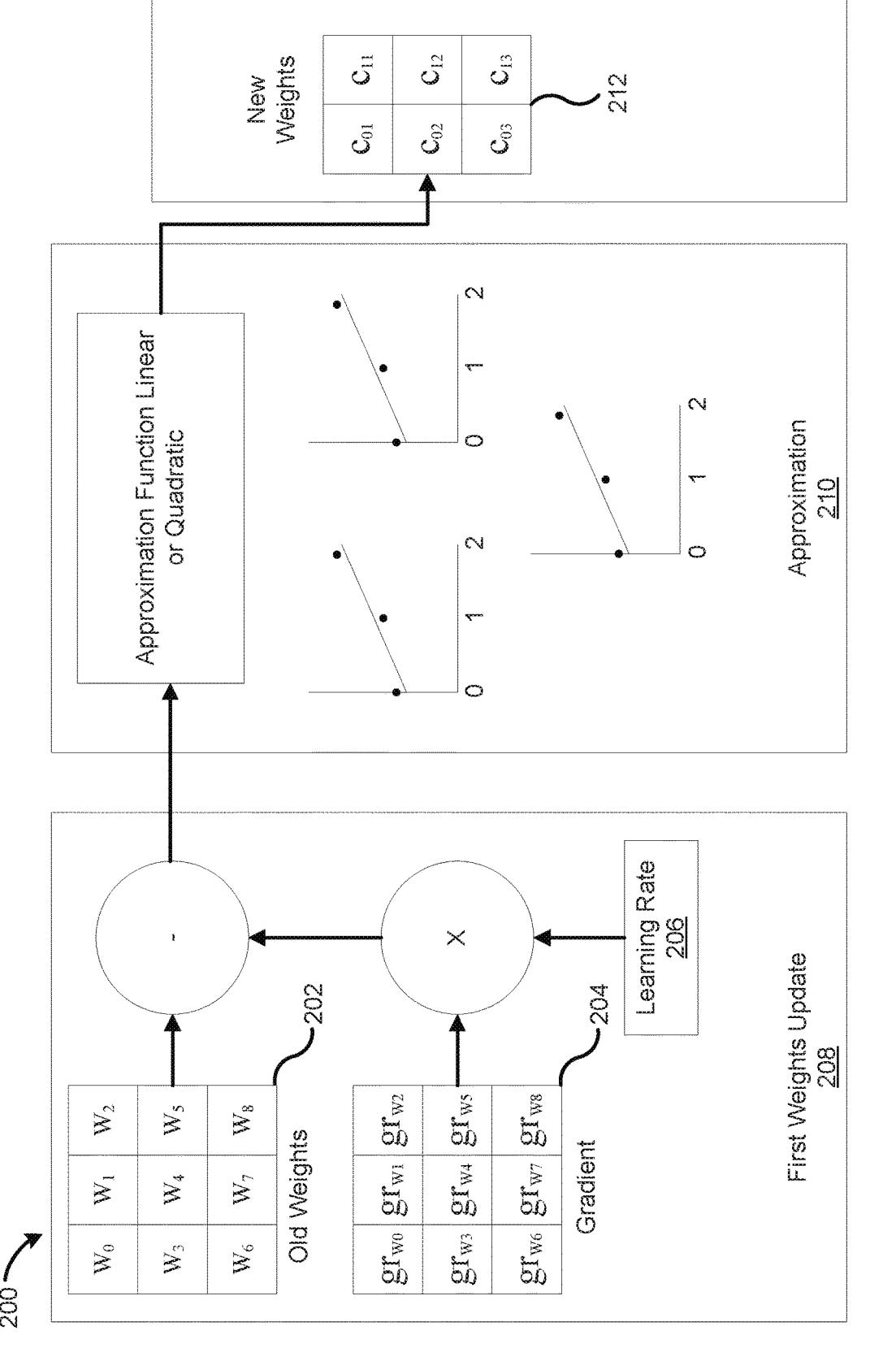
FIG. 2 illustrates an example process for use with the example process of FIG. 1, according to various embodiments.

Turning to FIG. 2, an example process 200 for use with linear/quadratic approximation in the training phase 104 of FIG. 1, is shown. FIG. 2 includes a 3×3 weight matrix 202 and a 3×3 gradient matrix 204. The process 200 at block 208 can include the gradients being multiplied by the learning rate 206 and subtracted from the old weights (1st weights update part). The process 200 at block 210 can include updating the weights using linear or quadratic approximation to compute the new weights or linear/quadratic equation coefficients 212. This approximation process is applied in the back-propagation for each batch. In some embodiments, the function can be improved by performing some of the computations in the first iteration and then the results can be reused in all other iterations to reduce the training time.

Figure 3:
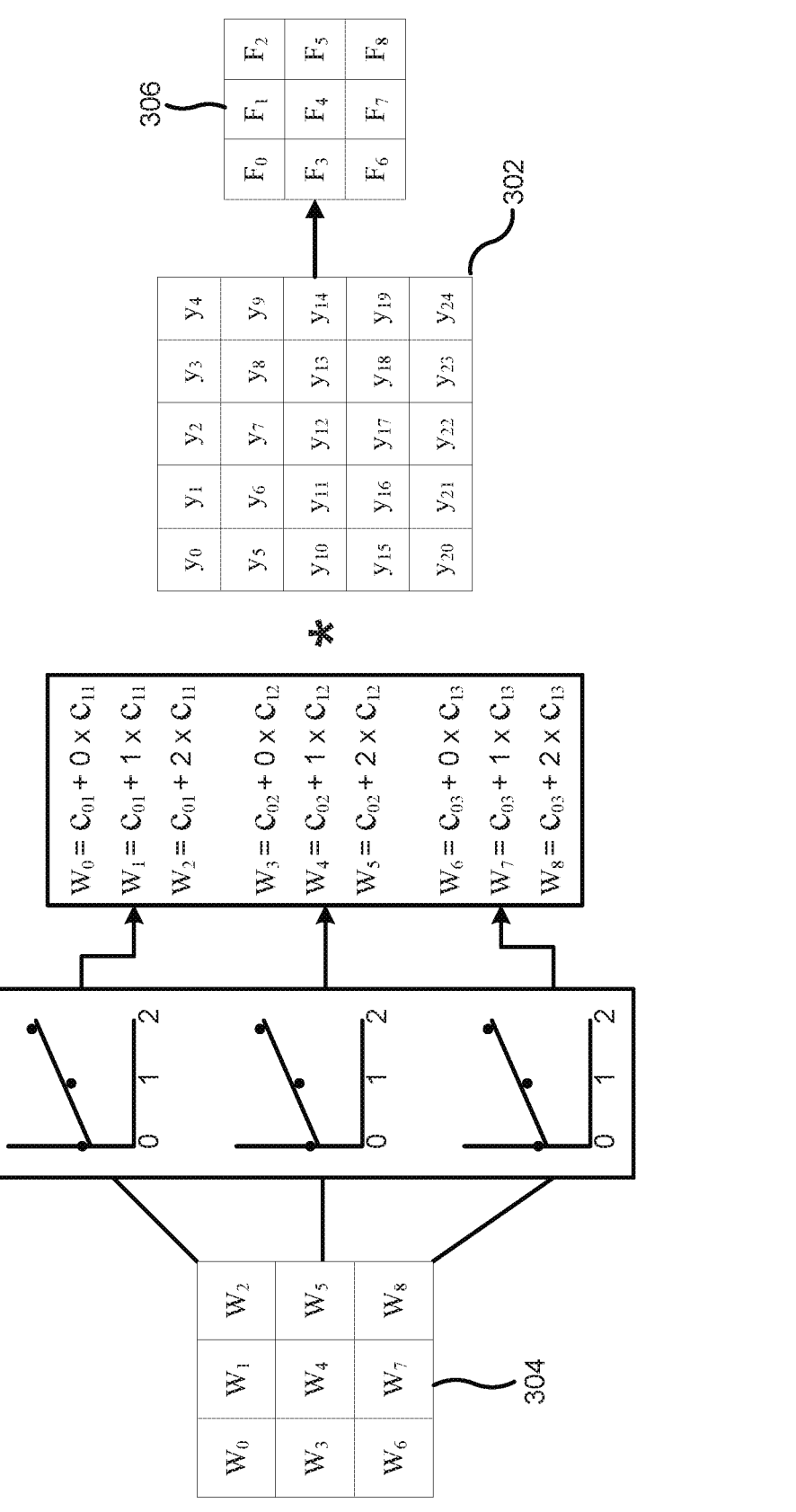
FIG. 3 illustrates an example process for approximating CNNS weights, according to various embodiments.

Turning to FIG. 3, an example process 300 for approximating Convolutional Neural Networks (CNNs) weights is shown. The size of the input image 302 can be 5×5 and the size of the filter 304 can be 3×3. The linear approximation method is applied for the filter 304 in which the value of any filter 304 could be computed using $c_{0j}+xc_{1j}$, where $c_{0j}$ is the first coefficient, $c_{1j}$ depicts the second coefficient, x could be 0, 1, 2 and j represents the row number of the filter 304. Generally, the linear approximation can be applied as follows: Each row of the filter 304 is taken as a group of weights and each group is approximated using the linear approximation method in interval $[x=0:N_w]$, where $N_w$ depicts the number of weights in each row. The coefficients of the linear equation in each row are then used to compute the new weights 306 for each filter. Each filter value is replaced with its approximate value that is computed using the coefficients of the linear equation as shown in FIG. 3.

The convolution outputs can be computed using equation 1: $F_0=w_1y_1+w_2y_2+w_3y_5+w_4y_6+w_5y_7+w_6y_{10}+w_7y_{11}+w_8y_{12}$ or by using equation 2: $F_0=c_{01}(y_0+y_1+y_2)+c_{11}(y_1+2y_2)+c_{02}(y_5+y_6+y_7)+c_{12}(y_6+2y_7)+c_{03}(y_{10}+y_{11}+y_{12})+c_{12}(y_{11}+2y_{12})$. The number of multipliers and weights can be reduced by a third when using equation 2 compared with using equation 1 (e.g., from 9 to 6). However, the number of adders may be increased. For example, the adders may increase from 8 to 14. However, the number of adders can be reduced by reusing the same computation operation multiple times in the PE array processor (e.g., as part of a computation reuse technique). For the FC layer, the weights are divided to uniform groups and each group of weights is linearly approximated as shown in FIG. 4.

Figure 4:
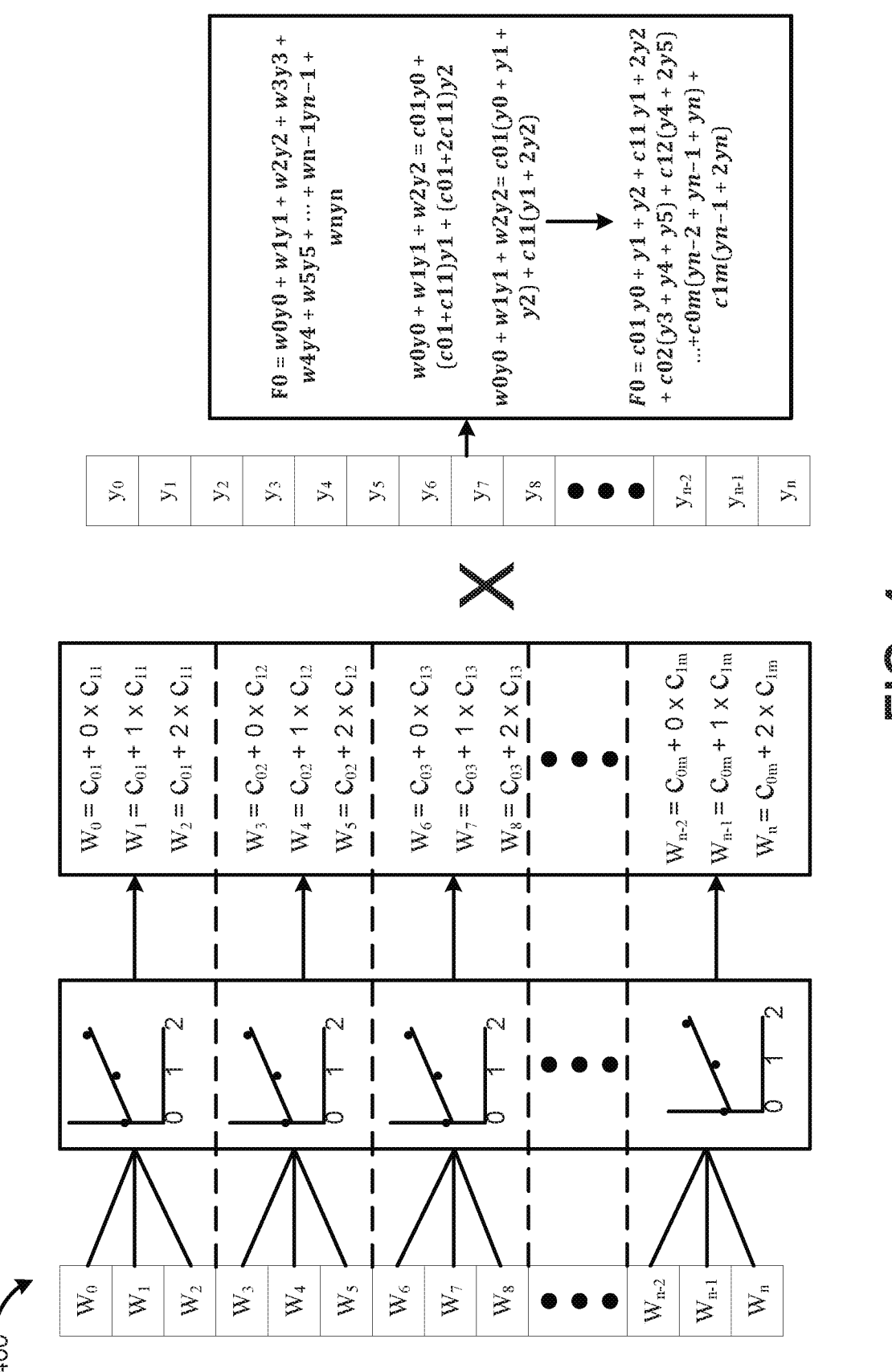
FIG. 4 illustrates an example process for determining an input image size and a filter size, according to various embodiments.

FIG. 4 shows a process 400 for determining an input image size of n×1 and a filter size of n×1. Similarly to CNN approximation, any filter value could be computed using $c_{0j}+xc_{1j}$. Increasing the number of weights inside the linear interval can also increase the reduction rate but may reduce accuracy. For example, the accuracy decreases as the number of weights inside the linear interval increase. On the other hand, the reduction rate is increased with increasing the number of weights inside the linear interval. The reduction rate for the weights can be computed using equation 3:

$$\text{reduction rate } (r) = \frac{n}{\frac{2n}{N_w}} = \frac{N_w}{2}$$

where n is the total number of weights and $N_w$ depicts the number of weights inside the linear interval. To enhance accuracy, a quadratic approximation method can be used to approximate the DNNs weights along with the linear approximation method discussed herein. The quadratic method can be used to approximate the CNN weights as presented in the example shown in FIG. 5.

Figure 5:
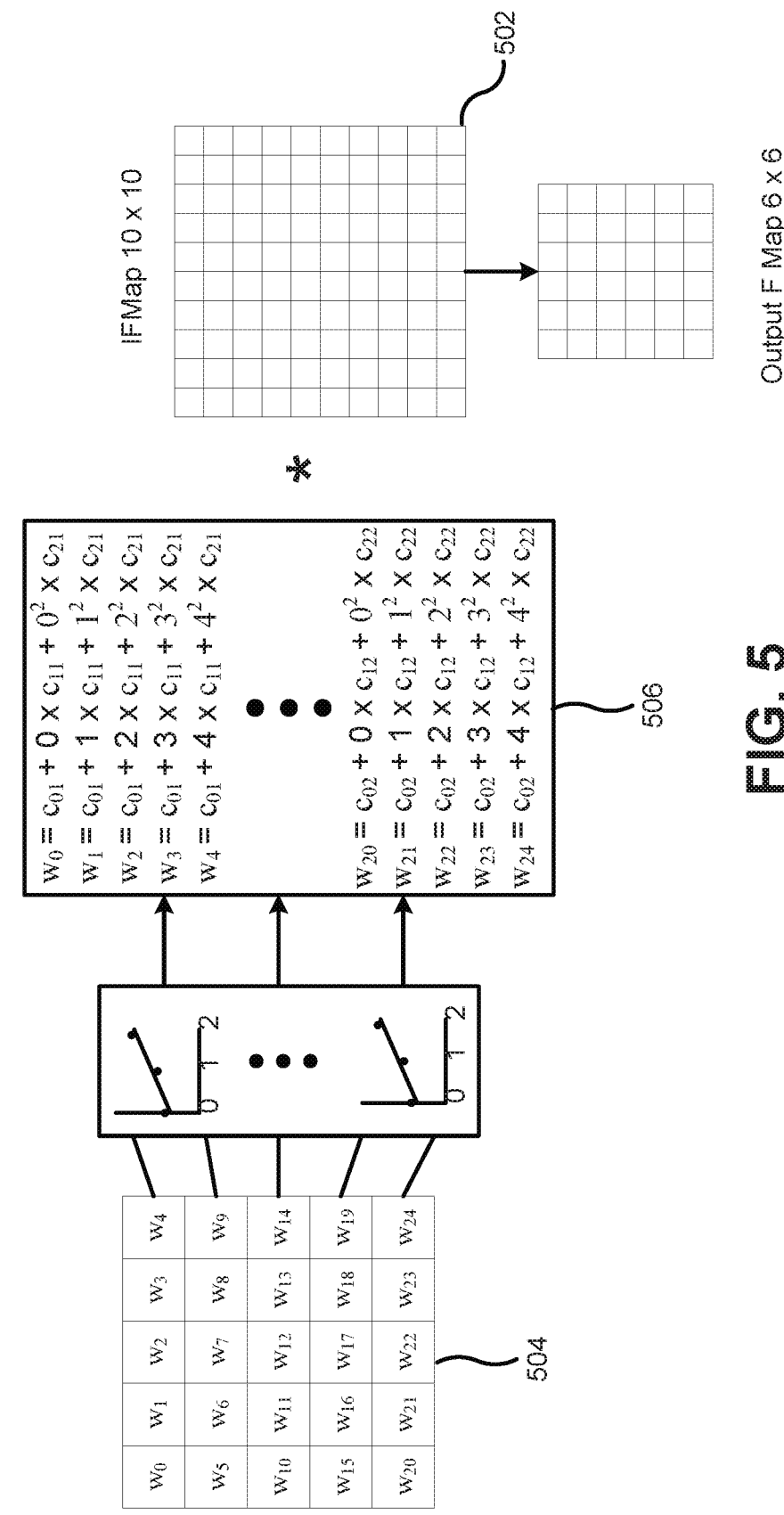
FIG. 5 illustrates an example process for quadratic approximation of CNN weights, according to various embodiments.

In FIG. 5, a process 500 for quadratic approximation of CNN weights, is shown. The process 500 can include an input image 502 with a size of 10×10 and a filter 504 with a size of 5×5. The quadratic approximation method can be applied for the filter 504 in which any filter value could be computed using $c_{0j}+xc_{1j}+x_2c_{2j}$, where $c_{0j}$, $c_{1j}$ and $c_{2j}$ are the binomial coefficients, x could be 0, 1, 2, 3, 4, and j represents the filter row number. Each row can be computed as shown in the equations 506 presented in FIG. 5. The FC layer can also be approximated using quadratic method like CNN, which all the weights are divided to uniform groups and each group of weights is approximated using a quadratic approximation method.

In FIG. 3, equations 4: $w_0y_0+w_1y_1+w_2y_2=c\_01y\_0+(c\_01+c\_11)y\_1+(c_{01}+2c_{11})y_2$ and 5: $w_0y_0++w_1y_1+w_2y_2=c_{01}(y_0+y_1+y_2)+c_{11}(y_1+2y_2)$ can be used with the convolution of input feature map (IFMap). For example, IFMap row 1 ($y_0$, $y_1$, $y_2$) and filter row 1 ($w_0$, $w_1$, $w_2$) need the following computations $d_0=y_0+y_1+y_2$ and $d_1=y_1+2y_2$. Based on the data reuse technique, those computations can be reused inside the PE array processor.

Figure 6:
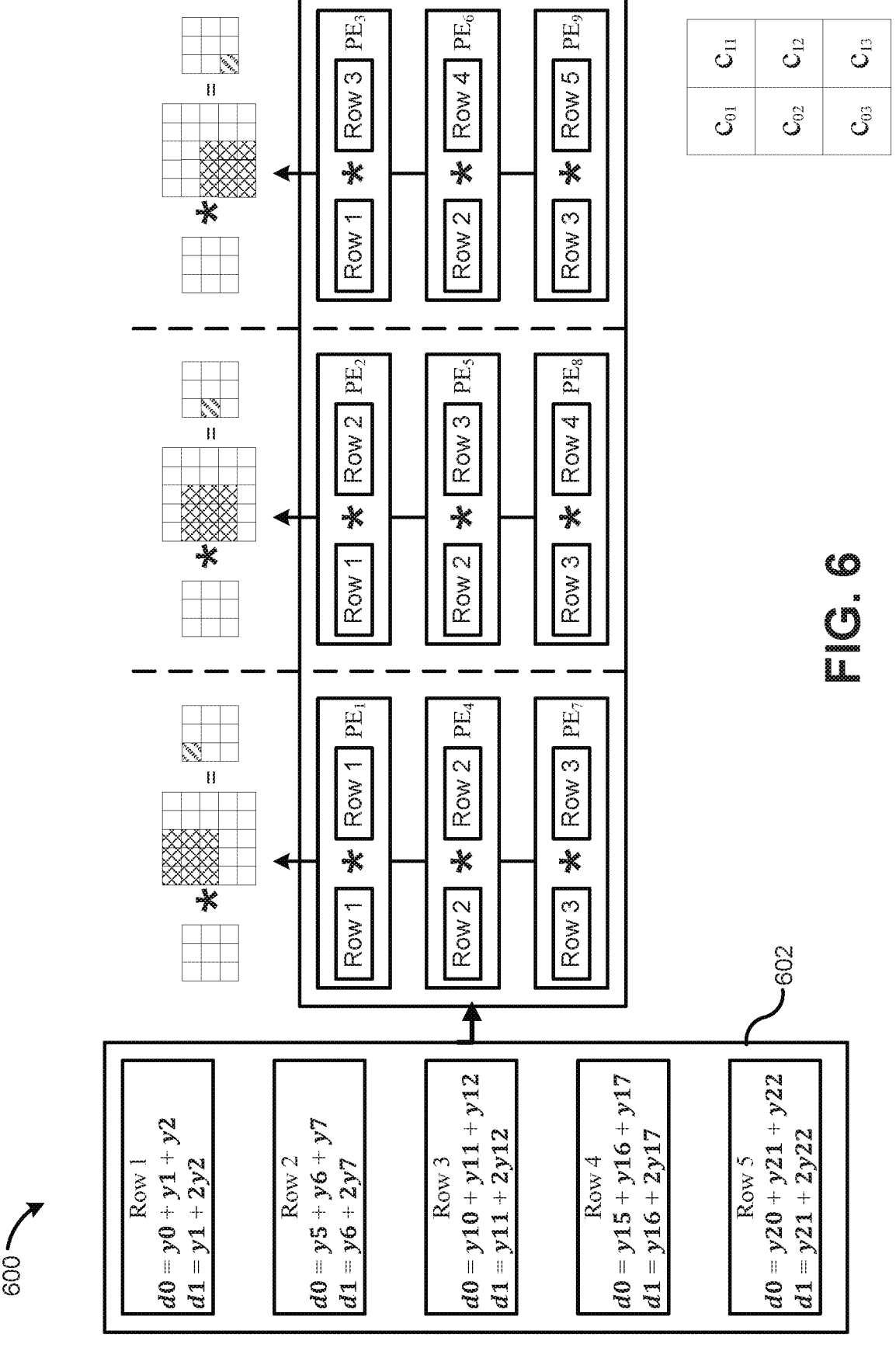
FIG. 6 illustrates an example process for generating partial output partial sums for CNN architecture, according to various embodiments.

FIG. 6 shows an example process 600 which can be used to generate the output partial sums for CNN architecture, in which filter reuse, input feature map reuse, and computational reuse methods are used. The computational reuse block 602 contains the operations needed for each input feature map rows. These operations are reused diagonally for multiple PEs processor. The partial sums are accumulated vertically for the PEs to generate the first column of the output feature map. To produce the second column of the output, all the selected elements at each row of input feature maps are shifted right by one column. The number of PE columns and rows equal the number of output feature map rows and the number of filter rows respectively. The amount of data reuse and computational reuse in the DNN layer (input feature map, filter weight, and output feature map) is a function of the layer shape and size.

Figure 7:
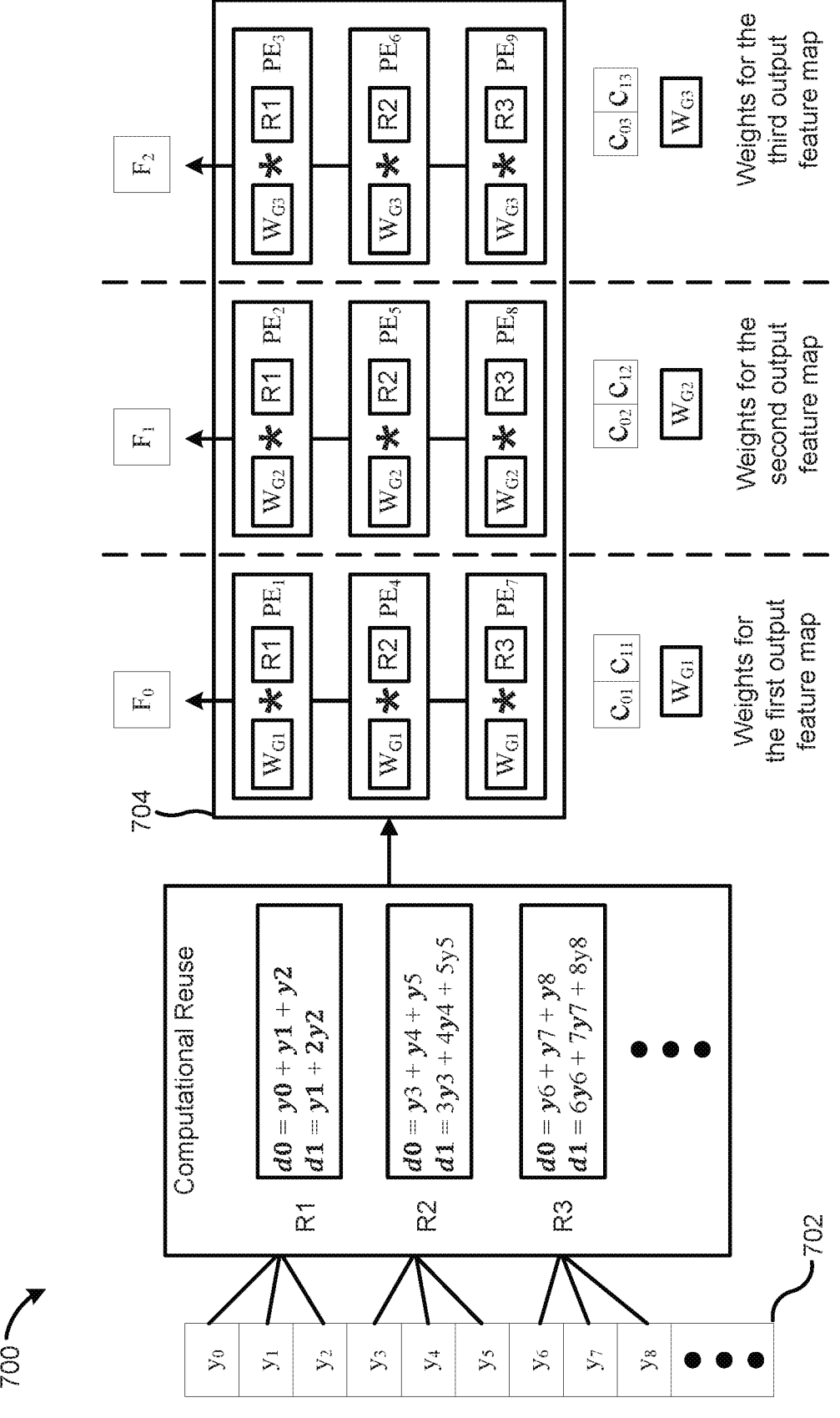
FIG. 7 illustrates an example process for producing an output partial sum for FC architecture, according to various embodiments.
Figure 8:
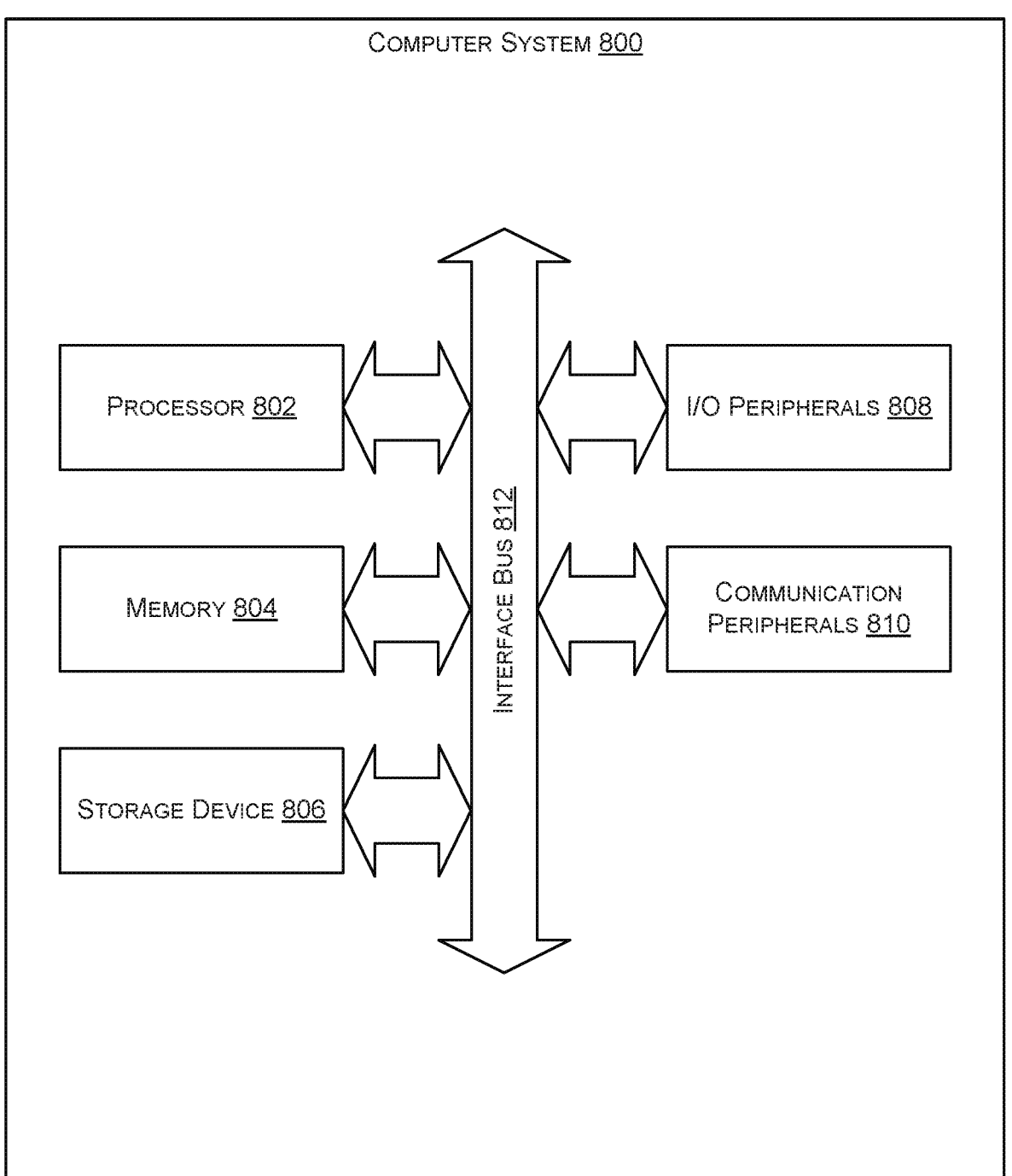
FIG. 8 illustrates an example of components of a computer system that can be used to implement the various processes, according to various embodiments.

FIG. 7 gives an example process 700 for producing the output partial sum for FC architecture. On the input feature map 702 can drive the computational reuse block 704 to produce the sub-computation needed in the PEs array. In this example, the number of weights inside the linear interval is 9 (e.g., $y_0$ to $y_8$) which means any 9 weights shared the same value. The computational reuse block 704 contains several sub-blocks (R1, R2 and R3 for each 9 IFMap) which includes the computation required for PEs. Fully connected layers are typically applied on the features extracted from the convolution layers for classification purposes. The FC layer also applies filter on the IFMap with kernel of the same size as the IFMap. Hence, it does not have the weight sharing feature like convolution layers. Based on the proposed algorithm of FC structure presented in FIG. 4, a repetition can be achieved for the FC weights. Taking advantage of repeated weights a weight reuse and computation reuse can be achieved as shown in FIG. 8. The weights are reused vertically and the sub-computations are reused horizontally.

The total number of adders and multipliers for the proposed CNN architecture based linear approximation method are computed as follows: $N_{add.mult}=N_1\times N_2+3\times N_3$ where $N_{add.mult}$ depicts the total number of adders and multipliers, $N_1$ is the number of IFMap rows (or groups), $N_2$ represents the number of adders needed for each IFMap row (or group) and $N_3$ is the total number of the PEs. and "3" means one adder+two multipliers inside each PE for proposed architecture.

For RS dataflow, the total number of adders and multipliers are $N_3\times N_4$, where $N_4$ depicts the number of adders and multipliers inside each PE for RS dataflow. An example of (filter 3×3 and IFMap 10×10), $N_1=10$, $N_2=3$, $N_3=3\times 8$ and $N_4=5$. The total number of adders and multipliers are 102 and 120 respectively. For proposed architecture (filter 3×3), each input feature map row demands 3 adders as given in FIG. 6, each PE uses one adder and two multipliers to perform $c_0\times d_0+c_1\times d_1$. For IFMap 10×10 and one filter 3×3, an output feature map 3×8 is generated.

FIG. 8 illustrates an example of components of a computer system 800 that can be used to implement the various embodiments of the present disclosure. The computer system can represent a user device, such as a smartphone tablet, laptop, or desktop computer, or a backend system, such as a server. Although the components of the computer system 800 are illustrated as belonging to a single system, the computer system 800 can also be distributed.

The computer system 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computer system 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computer system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computer system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce altera-tions to, variations of, and equivalents to such embodiments. Accordingly, it should be understood that the present dis-closure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifica-tions as would fall within the scope and spirit of the present disclosure.

Unless specifically stated otherwise, it is appreciated that throughout this specification discussions utilizing terms such as "processing," "computing," "calculating," "deter-mining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodi-ments of the present subject matter. Any suitable program-ming, scripting, or other type of language or combinations of languages may be used to implement the teachings con-tained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Having described several example configurations, various modifications, alternative constructions, and equivalents may be used without departing from the spirit of the dis-closure. For example, the above elements may be compo-nents of a larger system, wherein other rules may take precedence over or otherwise modify the application of the invention. Also, a number of steps may be undertaken before, during, or after the above elements are considered.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are suscep-tible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alterna-tive constructions, and equivalents falling within the spirit and scope of the disclosure, as defined in the appended claims.

The use of the terms "a" and "an" and "the" and similar referents in the context of describing the disclosed embodi-ments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless oth-erwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly con-tradicted by context.

All references, including publications, patent applica-tions, and patents, cited herein are hereby incorporated by reference to the same extent as if each reference were individually and specifically indicated to be incorporated by reference and were set forth in its entirety herein.

What is claimed is:

1. A computer-implemented method of reducing memory storage and energy used by deep neural networks, the computer-implemented method comprising:

determining weights associated with a deep neural net-work;

receiving an input feature map comprising input data;

generating approximated weights based on the input feature map and the weights by dividing the weights into uniform groups and linearly approximating each group of weights, wherein generating the approximated weights further comprises using a quadratic approximation; and performing a convolution inference using the approximated weights and the input feature map.

2. The computer-implemented method of claim 1, further comprising:

outputting an output feature map based on the convolution inference.

3. The computer-implemented method of claim 1, further comprising, prior to generating the approximated weights, sorting the weights from a lowest value to a highest value.

4. The computer-implemented method of claim 1, wherein the approximated weights are a first set of approximated weights and the method further comprises generating a second set of approximated weights based on the input feature map and the first set of approximated weights.

5. The computer-implemented method of claim 1, further comprising storing the approximated weights in a memory of an electronic device.

6. An electronic device, comprising:

memory; and a processor configured to:

determine weights associated with a deep neural network;

receive an input feature map comprising input data;

generate approximated weights based on the input feature map and the weights by dividing the weights into uniform groups and linearly approximating each group of weights, wherein generating the approximated weights comprises using a quadratic approximation; and perform a convolution inference using the approximated weights and the input feature map.

7. The electronic device of claim 6, wherein the electronic device comprises a portable electronic device comprising an energy storage device and a wireless transceiver.

8. The electronic device of claim 6, wherein the processor is further configured to output an output feature map based on the convolution inference.

9. The electronic device of claim 6, wherein the processor is further configured to, prior to generating the approximated weights, sort the weights from a lowest value to a highest value.

10. The electronic device of claim 6, wherein the approximated weights are a first set of approximated weights and the processor is further configured to generate a second set of approximated weights based on the input feature map and the first set of approximated weights.

11. The electronic device of claim 6, wherein the processor is further configured to store the approximated weights in the memory of the electronic device.

* * * * *